UNITED STATES PATENT OFFICE.

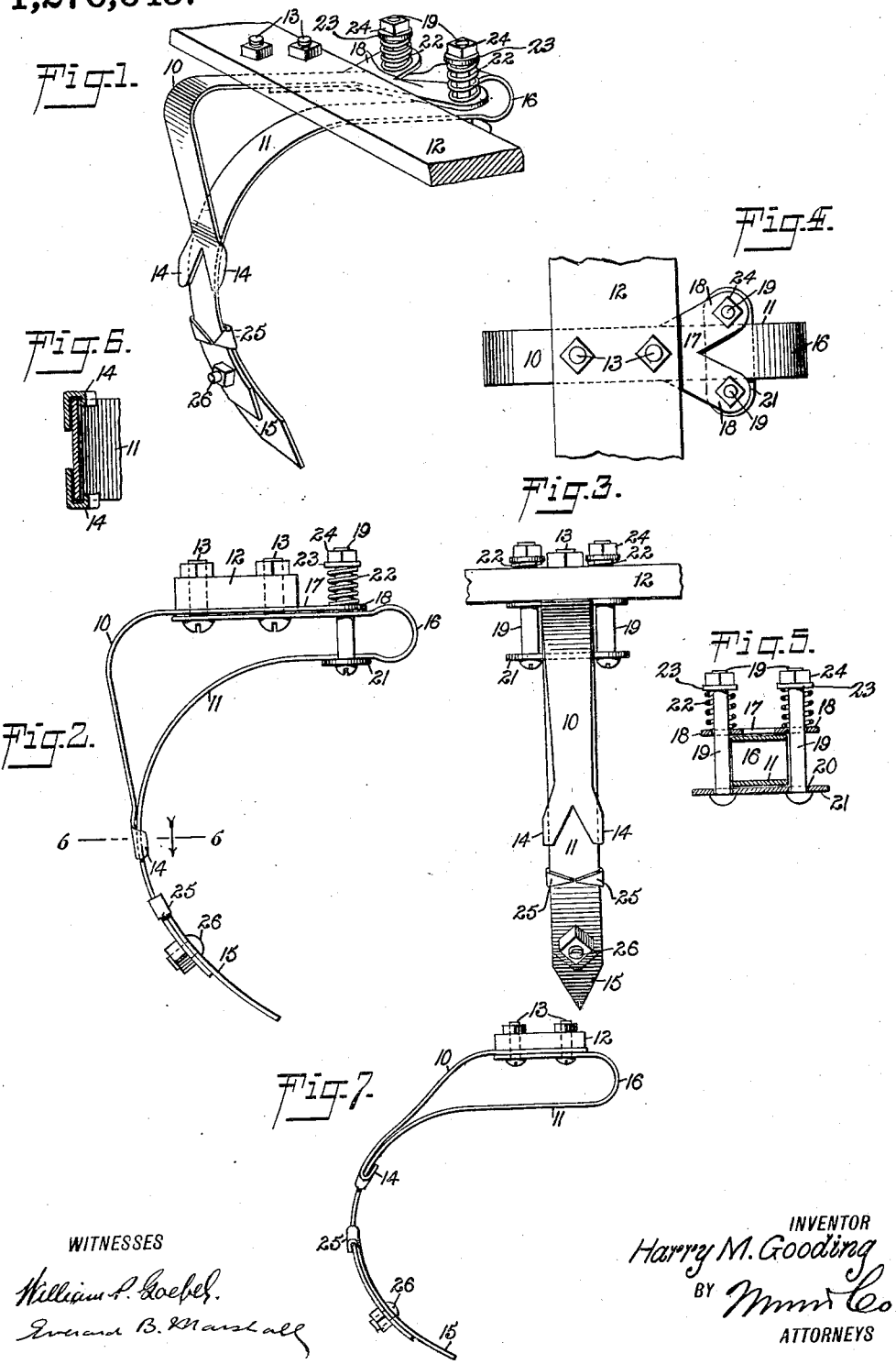

HARRY M. GOODING, OF ATTICA, OHIO.

HARROW-TOOTH.

1,276,645.
Specification of Letters Patent.
Patented Aug. 20, 1918.

Application filed March 14, 1917. Serial No. 154,712.

*To all whom it may concern:*

Be it known that I, HARRY M. GOODING, a citizen of the United States, and a resident of Attica, in the county of Seneca and State of Ohio, have invented a new and Improved Harrow-Tooth, of which the following is a full, clear, and exact description.

My invention has for its object to provide a spring tooth for harrows and cultivators which may be manufactured at little cost, and which will offer a constant and even yielding pressure when the harrow is operated, not only when the harrow tooth is in normal position, but also when it is pressed rearwardly by contact with an obstruction.

Another object of the invention is to provide the harrow tooth with yielding means to check the rebound of the tooth after passing over an obstruction.

These features are important, for when the resistance of the harrow tooth increases when pressed back by contact with an obstruction, there is danger that the harrow tooth will be broken, and unless the rebound of the harrow tooth is checked after passing over an obstruction there is also danger of breakage.

Additional objects of the invention will appear in the following specification in which the preferred form of the invention is disclosed.

In the drawings similar reference characters denote similar parts in all the views, in which—

Figure 1 is a perspective view illustrating my harrow tooth;

Fig. 2 is a side elevation of Fig. 1;

Fig. 3 is a rear view of Fig. 2;

Fig. 4 is a plan view of Fig. 2;

Fig. 5 is a transverse sectional view of Fig. 2;

Fig. 6 is a sectional view on the line 6—6 of Fig. 2; and

Fig. 7 is a side elevation illustrating a modified form of the invention.

By referring to the drawings, it will be seen that resilient blades 10 and 11 are secured preferably to the under side of a harrow member or support 12, the resilient blade 10 extending from the support 12 rearwardly and then downwardly, the resilient blade 11 extending from the support 12 forwardly where it is looped, the resilient blade 11 then extending rearwardly and downwardly. The resilient blades 10 and 11 are preferably secured to the support 12 by means of bolts 13. The resilient blade 11 has a sliding engagement with the resilient blade 10. As will be seen by referring to Fig. 6 of the drawings, the end of the resilient blade 10 has flanges 14 which are bent around the sides of the resilient blade 11 so that while the lower end of the resilient blade 10 is held against the resilient blade 11, the resilient blade 11 will have a sliding engagement with the resilient blade 10, and when the harrow tooth meets an obstruction the resilient blade 11 may pass upwardly relatively to the resilient blade 10, and both resilient blades may move rearwardly as may be necessary to permit a shovel or an extension blade 15 to pass over the obstruction, whatever its nature may be. After the shovel passes the obstruction, the rebound of the resilient blade 11 is checked by the resilient blade 10. The extension blade 15 is preferably constructed of resilient material.

As has been explained, the resilient blade 11 is looped at 16 at the front of the support 12. The upper end of the resilient blade 10 is forked at 17, the arms 18 extending beyond the sides of the resilient blade 11 so that bolts 19 may be disposed in orifices in the arms 18 and at the sides of the resilient blade 11, the lower ends of these bolts 19 being disposed in orifices 20 in a transverse plate 21, springs 22 being disposed around the bolts 19 above the arms 18; washers 23 being disposed against the bolts and being held in this position by nuts 24 which mesh with the bolt threads. By this means a resilient reinforcement is obtained for the resilient blade 11 at the sides of its looped portion 16.

The extension blade 15 is preferably provided with flanges 25 which are disposed around the sides of the resilient blade 11, there being orifices in the resilient blade 11 and in the extension blade 15 through which a bolt 26 is disposed. It will be understood that any suitable or appropriate shovel may be employed, having in mind the work which is to be performed and the condition of the ground.

In the modified form of the invention illustrated in Fig. 7 of the drawings, the bolts 19, the plate 21 and the springs 22 are omitted.

It will be understood that with the construction which has been described, the tooth will be suitably reinforced, and that means are provided for checking the rebound.

Having thus described my invention, I claim as new and desire to secure by Letters Patent:

1. In a harrow tooth, a support, resilient blades rigidly secured at one set of ends to the support and extending therefrom in opposite directions beyond the securing means and then converging downwardly, the end of one of the blades being slidable on the other blade and secured against movement therefrom.

2. In a harrow tooth, a support, two resilient blades, each having a horizontal longitudinally extending portion secured to the support, one of the blades extending from the rear of the support rearwardly and downwardly and the other blade at the front of the support extending downwardly and then rearwardly, the end of one of the blades being slidable on the other blade.

3. In a harrow tooth, a support, two resilient blades, each having a horizontal longitudinally extending portion secured to the support, one of the blades extending from the rear of the support rearwardly and downwardly and the other blade at the front of the support extending downwardly and then rearwardly, the end of one of the blades being slidable on the other blade and secured against movement therefrom.

4. In a harrow tooth, a blade extending forwardly, and then bent downwardly, rearwardly and downwardly, and resilient means connecting the forwardly and rearwardly extending portions of the blade, for the purpose specified.

5. In a harrow tooth, a blade having two portions connected by a loop, and resilient means connecting the two portions of the blade adjacent the loop.

6. In a harrow tooth, a blade having a looped portion, a plate disposed across the blade at one side of the looped portion, a blade having arms extending beyond the blade at the other side of the looped portion, and resilient means disposed at the sides of the blade and connecting the plate with the arms.

7. In a harrow tooth, a resilient blade having a looped portion, a plate disposed across the blade at one side of the looped portion, a blade having arms extending beyond the blade at the other side of the looped portion, and resilient means disposed at the sides of the blade and connecting the plate with the arms.

8. In a harrow tooth, a support, two resilient blades secured to the support, one of the blades extending from the rear of the support rearwardly and downwardly and the other blade which is disposed at the front of the support, being looped and then extending rearwardly and downwardly, resilient means connecting portions of the blade at the front of the support at the sides of its looped portion, the lower end of one of the blades having sliding engagement with the other blade and being secured against movement therefrom.

9. In a harrow tooth, a support, a resilient blade secured to the support with its rear end and with its other end disposed downwardly and the front of the support, extending beyond the front of the support, another resilient blade secured to the support and extending at the front thereof below the second mentioned end of the first resilient blade, the second resilient blade being looped and then extending rearwardly and downwardly, resilient means secured to the said other end of the first resilient blade and extending under the looped portion of the second resilient blade, the first end of the first resilient blade having sliding engagement with the second resilient blade and being secured against movement therefrom.

10. In a harrow tooth, a support, a resilient blade having a horizontal longitudinally extending portion secured to the bottom of the support and extending rearwardly from the rear of the support and then downwardly, a second resilient blade having a horizontal longitudinally extending portion secured to the bottom of the support and extending from the front of the support downwardly and then rearwardly, the end of the first blade having flanges bent around the sides of the other blade for the purpose specified.

11. In a harrow tooth, a support, a resilient blade having a horizontal longitudinally extending portion secured to the bottom of the support and extending rearwardly from the rear of the support and then downwardly, a second resilient blade having a horizontal longitudinally extending portion secured to the bottom of the support and extending from the front of the support downwardly and then rearwardly, one of the blades having flanges bent around the sides of the other blade for the purpose specified.

12. In a harrow tooth, a support, a resilient blade secured to the support and extending from the rear of the support rearwardly and downwardly, a second resilient blade secured to the support and which is looped at the front of the support and which then extends rearwardly and downwardly, the first blade having arms disposed against the outer sides of the last-mentioned blade at the front of the support and adjacent its looped portion, a plate disposed under the said looped portion of the second blade, the plate and the arms having orifices, bolts disposed in the orifices, and springs on the bolts above the looped portion of the blade.

13. In a harrow tooth, a support, a resilient blade secured to the support with its rear end disposed downwardly and with its other end extending beyond the front of the support, another resilient blade secured to the support and extending at the front thereof below the second mentioned end of the first resilient blade, the second resilient blade being looped and then extending rearwardly and downwardly, the second mentioned end of the first resilient blade having arms extending beyond the sides of the second resilient blade, a plate disposed transversely under the looped portion of the second resilient blade, the arms and the plate having orifices beyond the blades, bolts disposed in the orifices, and springs on the bolts above the said other end of the first resilient blade, the first end of the first resilient blade having sliding engagement with the second resilient blade and being secured against movement therefrom.

14. In a harrow tooth, a support, two resilient blades, each having a horizontal longitudinally extending portion secured to the support, one of the blades extending from the rear of the support rearwardly and downwardly and the other blade at the front of the support extending downwardly and then rearwardly, the end of the blade extending from the rear of the support having flanges bent around the sides of the other blade, for the purpose specified.

HARRY M. GOODING.

Copies of this patent may be obtained for five cents each, by addressing the "Commissioner of Patents, Washington, D. C."